(12) United States Patent
Watari et al.

(10) Patent No.: US 9,953,729 B2
(45) Date of Patent: Apr. 24, 2018

(54) RADIATION GENERATING APPARATUS AND RADIATION GENERATING METHOD

(75) Inventors: Takeshi Watari, Hamamatsu (JP);
Katsunobu Nishihara, Hamamatsu (JP); Masaru Takagi, Hamamatsu (JP); Nakahiro Satoh, Hamamatsu (JP); Toshiyuki Kawashima, Hamamatsu (JP); Hirofumi Kan, Hamamatsu (JP)

(73) Assignee: HAMAMATSU PHOTONICS K.K., Hamamatsu-shi, Shizuoka (JP)

( * ) Notice: Subject to any disclaimer, the term of this patent is extended or adjusted under 35 U.S.C. 154(b) by 971 days.

(21) Appl. No.: 14/348,137

(22) PCT Filed: Aug. 8, 2012

(86) PCT No.: PCT/JP2012/070227
§ 371 (c)(1),
(2), (4) Date: Mar. 28, 2014

(87) PCT Pub. No.: WO2013/051338
PCT Pub. Date: Apr. 11, 2013

(65) Prior Publication Data
US 2014/0226772 A1    Aug. 14, 2014

(30) Foreign Application Priority Data

Oct. 6, 2011 (JP) ................................ 2011-222304

(51) Int. Cl.
*G21B 1/03* (2006.01)
*G21B 3/00* (2006.01)
(Continued)

(52) U.S. Cl.
CPC .............. *G21B 3/006* (2013.01); *H05H 3/06* (2013.01); *H05G 2/005* (2013.01); *H05G 2/006* (2013.01)

(58) Field of Classification Search
USPC .................................................. 376/102, 103
See application file for complete search history.

(56) References Cited

U.S. PATENT DOCUMENTS 3,378,446 A * 4/1968 Whittlesey ............... G21B 1/23
219/121.11
3,489,645 A * 1/1970 Hertzberg ................ G21B 1/23
376/101
(Continued)

FOREIGN PATENT DOCUMENTS

CN      1379968     11/2002
CN    101682980     3/2010
(Continued)

OTHER PUBLICATIONS

English-language Machine Translation of JP Publication Patent Application (PCT)[T] No. 2008-511110.
(Continued)

*Primary Examiner* — Jack W Keith
(74) *Attorney, Agent, or Firm* — Drinker Biddle & Reath LLP (57) ABSTRACT

A radiation generating apparatus comprises a fuel storage unit 20 for storing a mixed liquid 61, a pressure application unit 10 for applying a pressure to the mixed liquid 61, a jet formation unit 30 for forming a jet 61a of the mixed liquid 61, a reaction unit 44 for forming the jet 61a of the mixed liquid 61 therein, a pressure adjustment unit 41 for setting a pressure in the reaction unit 44 lower than an internal pressure of the jet formation unit 30, and a light source unit 45 for irradiating a particle group 63a with laser light L1.

12 Claims, 7 Drawing Sheets

(51) Int. Cl.
*H05H 3/06* (2006.01)
*H05G 2/00* (2006.01)

(56) References Cited

U.S. PATENT DOCUMENTS

| | | | |
|---|---|---|---|
| 5,043,131 A * | 8/1991 | Musinski | G21B 1/03 376/103 |
| 7,492,867 B1 | 2/2009 | Richardson | |
| 7,599,470 B2 | 10/2009 | Kloepfel et al. | |
| 2008/0067456 A1 | 3/2008 | Kloepfel et al. | |
| 2008/0226010 A1* | 9/2008 | Sesselmann | G21B 1/00 376/102 |
| 2012/0288047 A1* | 11/2012 | Ventikos | G21B 3/006 376/102 |
| 2013/0114774 A1* | 5/2013 | Ventikos | G21B 3/006 376/149 |

FOREIGN PATENT DOCUMENTS

| | | |
|---|---|---|
| EP | 0 858 249 | 8/1998 |
| JP | H10-221499 | 8/1998 |
| JP | 2002-514740 | 5/2002 |
| JP | 2003-337200 | 11/2003 |
| JP | 2007-200615 | 8/2007 |
| JP | 2007-288190 | 11/2007 |
| JP | 2008-511110 | 4/2008 |
| JP | 4578883 | 11/2010 |
| WO | WO 01/049087 | 7/2001 |
| WO | WO 2011/027717 | 3/2011 |

OTHER PUBLICATIONS

Tsukigase, Azusa, et al., "Particle Size Control in Monodisperse Polystryrene Particle Synthesis by a Soap-Free Emulsion Polymerization Method,"Kobunshi Ronbunshu, 2007, vol. 64, No. 3, pp. 147-154 (with attached partial English-language translation).

Tsukigase, A., et al., "Precision Control of Particle System in Synthesis of Mnodispersed PMMA Particles by Soap-Free Emulsion Polymerization," Kobunshi Ronbunshu, vol. 63, No. 4, 2006, pp. 266-272 (with attached partial-English-language translation).

Takagi, M., et al., "Development of Deuterated Polystyrene Target for Laser Fusion by Means of Density-Matched Emulsion Method," Kobunshi Ronbunshu, vol. 48, 1991, pp. 41-45 (with attached partial English-language translation).

Takagi, M., et al., "Fabrication of Deuterated-Tritiated Polystryrene Shells for Laser Fusion Experiments by Means of an Isotope Exchange Reaction," Institute of Laser Engineering, Osaka University, J.Vac.Sci.Technol. A10, 1992, pp. 239-242.

\* cited by examiner

RADIATION GENERATING APPARATUS AND RADIATION GENERATING METHOD

TECHNICAL FIELD

The present invention relates to a radiation generating apparatus and a radiation generating method.

BACKGROUND ART

Radiations such as X-rays, gamma rays, and neutron beams are generated in a micro region where a nuclear fusion occurs. By utilizing this phenomenon, dot-like radiation sources are provided. Therefore, apparatus which generate various radiations by irradiating fuel particles which are fusion fuels with lasers have been under study.

An example of such radiation generating apparatus is one which generates neutrons by using a high-intensity proton accelerator. There is also an apparatus which generates neutrons by irradiating a thin plastic film, whose hydrogen is replaced with deuterium, with laser light. Further, there is an apparatus which generates high-energy protons by irradiating a hydrogen-containing particle or thin film with laser light.

Patent Literature 1 discloses an apparatus which generates neutrons. As a fusion fuel, this apparatus uses a microdroplet formed by liquid deuterium. First, in the apparatus, liquid deuterium is jetted from a nozzle, so as to produce a droplet of liquid deuterium. The droplet is irradiated with infrared laser light, so as to explode into microdroplets. The microdroplets are irradiated with a femtosecond pulse laser, so as to be ionized, and the resulting ions are caused to collide with each other, so as to generate neutrons.

CITATION LIST

Patent Literature

Patent Literature 1: Japanese Translated International Application Laid-Open No. 2002-514740

Non Patent Literature

Non Patent Literature 1: Japanese Journal of Polymer Science and Technology, Vol. 64, pp. 147-154 (2007)
Non Patent Literature 2: Japanese Journal of Polymer Science and Technology, Vol. 48, pp. 41-45 (1991)
Non Patent Literature 3: J. Vac. Sci. Technol. A10, 239-242 (1992)

SUMMARY OF INVENTION

Technical Problem

However, the apparatus generating neutrons by using a high intensity proton accelerator is very large and has a complicated structure. The apparatus generating neutrons by irradiating a thin plastic film with laser light has a problem that its neutron generation efficiency is suppressed when repeatedly generating neutrons. The apparatus generating protons by irradiating a hydrogen-containing thin film or the like with laser light has a problem that the proton generation efficiency is suppressed.

The neutron generating apparatus disclosed in Patent Literature 1 uses liquid deuterium and thus necessitates a refrigerator for keeping the whole apparatus at low temperature. It also requires a laser light source for making microparticles out of droplets jetted from the nozzle. Therefore, the neutron generating apparatus is constructed by combining a plurality of devices and thus may become complicated in structure. Further, vapors existing about deuterium droplets may inhibit the laser from being absorbed, thereby lowering the neutron generation efficiency.

In view of the problems mentioned above, it is an object of the present invention to provide a radiation generating apparatus and radiation generating method which can simplify the structure of the apparatus and improve the radiation generation efficiency, for example.

Solution to Problem

The radiation generating apparatus in accordance with one aspect of the present invention comprises a fuel storage unit for storing a mixed liquid having a liquefied gas mixed in a suspension containing a liquid and a plurality of fuel particles dispersed in the liquid, a pressure application unit for applying a pressure to the mixed liquid stored in the fuel storage unit, a jet formation unit for jetting the pressurized mixed liquid out of a small hole so as to form a jet of the mixed liquid, a reaction unit for forming the jet therein, a pressure adjustment unit for setting a pressure in the reaction unit lower than an internal pressure of the jet formation unit, and a light source unit for irradiating a particle group constituted by the plurality of fuel particles with laser light; wherein the fuel particle generates a desirable radiation when irradiated with the laser light; and wherein, in the reaction unit, the plurality of fuel particles move along a direction of the jet, while the liquefied gas and the liquid move away from the plurality of fuel particles, so as to form the particle group.

In this radiation generating apparatus, the mixed liquid having the liquefied gas mixed in the suspension is jetted from the jet formation unit to the reaction unit. The reaction unit has a pressure set lower than the internal pressure of the jet formation unit. The liquefied gas in the jet of the mixed liquid vaporizes drastically, so as to expand, thereby dissipating liquid components from the suspension. This eliminates the liquefied gas and liquid from the jet of the mixed liquid. The fuel particles have a kinetic energy imparted when jetted out of the jet formation unit and thus advance straightforward in a predetermined direction, so as to form a particle group. The particle group is irradiated with laser light, so as to generate a desirable radiation. Thus, a structure for jetting the mixed liquid containing the fuel particles forms the particle group, whereby the apparatus can be constructed simple. Since the particle group to be irradiated with the laser light is mixed with a reduced amount of the liquid, gas, and the like, the laser light is restrained from scattering. Hence, the particle group is favorably irradiated with the laser light, so that the radiation generation efficiency can be improved.

The radiation generating apparatus in accordance with one aspect of the present invention comprises a fuel storage unit for storing a suspension containing a liquid and a plurality of fuel particles dispersed in the liquid, a pressure application unit for applying a pressure to the suspension stored in the fuel storage unit, a jet formation unit for jetting the pressurized suspension out of a small hole so as to form a jet of the suspension, an exhaust unit for letting out the vaporized liquid from the suspension so as to form a particle group constituted by the plurality of fuel particles and expel the particle group, a reaction unit for letting in the particle group constituted by the plurality of fuel particles, and a light source unit for irradiating the particle group with laser light; wherein the fuel particle generates a desirable radiation when irradiated with the laser light.

In this radiation generating apparatus, the suspension is jetted from the jet formation unit to the exhaust unit. In the exhaust unit, the liquefied gas and liquid components are eliminated from the jet of the suspension. The fuel particles have a kinetic energy imparted when jetted out of the jet formation unit and thus advance straightforward in a predetermined direction, so as to form a particle group. The particle group is irradiated with laser light, so as to generate a desirable radiation. Thus, a structure for jetting the suspension containing the fuel particles forms the particle group, whereby the apparatus can be constructed simple. Since the particle group to be irradiated with the laser light is mixed with a reduced amount of the liquid and the like, the laser light is restrained from scattering. Hence, the particle group is favorably irradiated with the laser light, so that the radiation generation efficiency can be improved.

The radiation generating apparatus may further comprise a measurement unit for obtaining a measurement value corresponding to the number of fuel particles per unit volume of the particle group. Such a structure can yield a measurement value corresponding to the number density of fuel particles. According to this measurement value, control for irradiating the particle group with the laser light at an optimal timing can be performed. This can further improve the radiation generation efficiency.

In the radiation generating apparatus, the fuel particle may contain deuterium and generate a neutron when irradiated with the laser light. In such a structure, a deuterium ion occurs when the fuel particle is irradiated with the laser light. This deuterium ion causes a deuterium nuclear fusion reaction, thereby generating a neutron. Therefore, a neutron beam which is a radiation can be generated efficiently.

In the radiation generating apparatus, the fuel particle may contain hydrogen and generate a proton when irradiated with the laser light. In such a structure, a hydrogen ion occurs when the fuel particle is irradiated with the laser light. This hydrogen ion causes a hydrogen nuclear fusion reaction, thereby generating a proton. Therefore, a proton beam which is a radiation can be generated efficiently.

In the radiation generating apparatus, the fuel particle may contain an atom having a predetermined energy resonance line and generate an electromagnetic radiation corresponding to the energy resonance line. In such a structure, an electromagnetic radiation corresponding to the energy resonance line in the predetermined atom occurs when the fuel particle is heated by irradiation with the laser light.

Therefore, a desirable electromagnetic radiation can be generated efficiently.

The radiation generating method in accordance with one aspect of the present invention comprises a storage step of storing in a fuel storage unit a mixed liquid having a liquefied gas mixed in a suspension containing a liquid and a plurality of fuel particles dispersed in the liquid, a pressure application step of applying a pressure to the mixed liquid stored in the fuel storage unit, a jet formation step of jetting the pressurized mixed liquid out of a small hole so as to form a jet of the mixed liquid in a reaction unit, and a radiation generation step of irradiating a particle group constituted by the plurality of fuel particles with laser light so as to generate a radiation; the method having, before the jet formation step, a pressure adjustment step of setting a pressure in the reaction unit forming the jet of the mixed liquid lower than an internal pressure of the jet formation unit; wherein the fuel particle generates a desirable radiation when irradiated with the laser light; and wherein, in the reaction unit where the particle group is formed by vaporizing the liquefied gas and liquid and eliminating the liquid from the jet of the mixed liquid by the liquefied gas, the plurality of fuel particles move along a direction of the jet, while the liquefied gas and the liquid move away from the plurality of fuel particles, so as to form the particle group.

In this radiation generating method, a liquefied gas mixed in a suspension is vaporized, so as to dissipate liquid components of the suspension. This can form a particle group constituted by a plurality of fuel particles having eliminated the liquefied gas and liquid from the jet of the mixed liquid. Since the particle group to be irradiated with the laser light is mixed with a reduced amount of the liquid, gas, and the like, the laser light is restrained from scattering. Hence, the particle group can favorably be irradiated with the laser light, whereby the radiation can be obtained efficiently.

The radiation generating method in accordance with one aspect of the present invention comprises a storage step of storing in a fuel storage unit a suspension containing a liquid and a plurality of fuel particles dispersed in the liquid, a pressure application step of applying a pressure to the suspension stored in the fuel storage unit, a jet formation step of jetting the pressurized suspension out of a small hole so as to form a jet of the suspension, an exhaust step of letting out the liquid from the jet of the suspension so as to form a particle group constituted by the plurality of fuel particles and expel the particle group, and a radiation generation step of irradiating the particle group constituted by the plurality of fuel particles with laser light so as to generate a radiation; wherein the fuel particle generates a desirable radiation when irradiated with the laser light.

In the radiation generating method in accordance with one aspect of the present invention, liquid components are eliminated from the jet of the suspension in the exhaust step. This can form a particle group constituted by a plurality of fuel particles having eliminated the liquid from the jet of the suspension. Since the particle group to be irradiated with the laser light is mixed with a reduced amount of the liquid and the like, the laser light is restrained from scattering. Hence, the particle group can favorably be irradiated with the laser light, whereby the radiation can be obtained efficiently.

Advantageous Effects of Invention

The radiation generating apparatus and radiation generating method in accordance with one aspect of the present invention can simplify the structure of the apparatus and improve the radiation generation efficiency, for example.

DESCRIPTION OF EMBODIMENTS

In the following, preferred embodiments of the radiation generating apparatus and radiation generating method in accordance with one aspect of the present invention will be explained in detail with reference to the accompanying drawings. In the drawings, the same constituents will be referred to with the same signs while omitting their overlapping descriptions. The radiation in the embodiments encompasses electron beams, ion beams, neutron beams, X-rays, soft X-rays, and very short ultraviolet rays.

Figure 1:
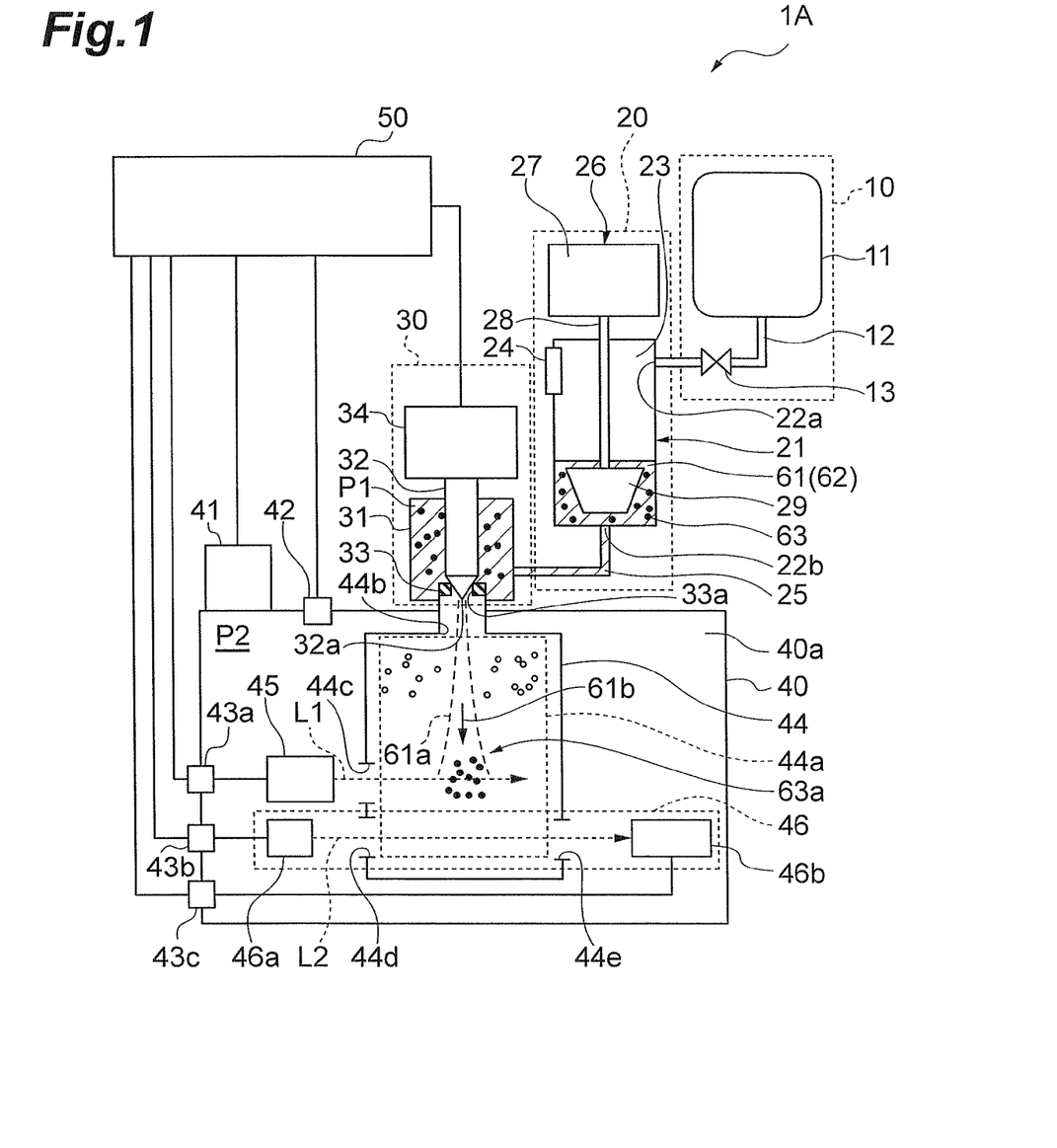
FIG. 1 is a diagram for explaining the structure of the radiation generating apparatus in accordance with a first embodiment.

FIG. 1 is a diagram for explaining the structure of a radiation generating apparatus 1A in accordance with the first embodiment. The radiation generating apparatus 1A is an apparatus for generating a neutron which is a radiation. The radiation generating apparatus 1A comprises a pressure application unit 10, a fuel storage unit 20, a jet formation unit 30, a chamber 40, and a main control unit 50. The chamber 40 is provided with an exhaust device 41 (pressure adjustment unit), a pressure gauge 42, and I/O terminals 43a to 43c. Arranged in an inner region 40a of the chamber 40 are a reaction container 44, a laser light source 45 (light source unit), and a measurement unit 46.

The pressure application unit 10 is equipped with a high-pressure gas tank 11. The high-pressure gas tank 11 is connected to the fuel storage unit 20 through a gas pipe 12. The high-pressure gas tank 11 stores therein a high-pressure gas held at 5 to 10 atm (at least 5 atm but not greater than 10 atm). The high-pressure gas is used for applying a pressure (back pressure) to the fuel storage unit 20. The gas pipe 12 is provided with a valve 13. The valve 13 is adjusted so as to apply the pressure to the fuel storage unit 20. The valve 13 has such a structure as to be electromagnetically opened and closed and can be operated repeatedly.

Examples of the high-pressure gas for use include fluorocarbon-based gases and hydrocarbon-based gases. The fluorocarbon-based gases and hydrocarbon-based gases liquefy when a pressure of 5 to 10 atm (at least 5 atm but not greater than 10 atm) is applied thereto, thereby becoming liquefied gases. The liquefied fluorocarbon-based gases and hydrocarbon-based gases vaporize explosively in a reduced-pressure atmosphere. Here, the fluorocarbon-based gases are so-called CFC gases. The fluorocarbon-based gases are gases made of organic compounds having carbon-hydrogen bonds or mixed gases containing gases made of these organic compounds. Examples of the fluorocarbon-based gases include HCFC-22, HCFC-123, HCFC-14a, HCFC-142b, HFC-23, HFC-32, HFC-125, HFC-134a, HFC-143a, HFC-143a, and HFC-152a. The hydrocarbon-based gases are gases made of organic compounds having carbon-hydrogen bonds or mixed gases containing gases made of these organic compounds. Examples of the hydrocarbon-based gases include propane and butane.

The fuel storage unit 20 is equipped with a storage container 21 and a stirrer 26. The fuel storage unit 20 is provided with an input part 22a, an exit part 22b, a storage region 23, and a fuel supply unit 24. The gas pipe 12 connected to the high-pressure gas tank 11 is joined to the input part 22a. An outlet pipe 25 connected to the jet formation unit 30 is joined to the exit part 22b. The storage region 23 stores a mixed liquid 61. The mixed liquid 61 is supplied from the fuel supply unit 24. The mixed liquid 61 is discharged to the jet formation unit 30 through the outlet pipe 25.

The mixed liquid 61 will now be explained. The mixed liquid 61 is a suspension 62 having a liquefied gas mixed therein. A fluorocarbon- or hydrocarbon-based gas is used for the liquefied gas. The suspension 62 contains a predetermined liquid and fuel particles 63 dispersed in the liquid. The suspension 62 is a colloidal solution having the fuel particles 63 suspended therein. When a jet 61a of the mixed liquid 61 is formed in the jet formation unit 30, the predetermined liquid transmits a kinetic energy to the fuel particles 63. As the predetermined liquid, one which is easy to vaporize but never dissolves the fuel particles 63 is selected. Examples of the predetermined liquid for use include methanol and ethanol which are alcohols.

Figure 2:
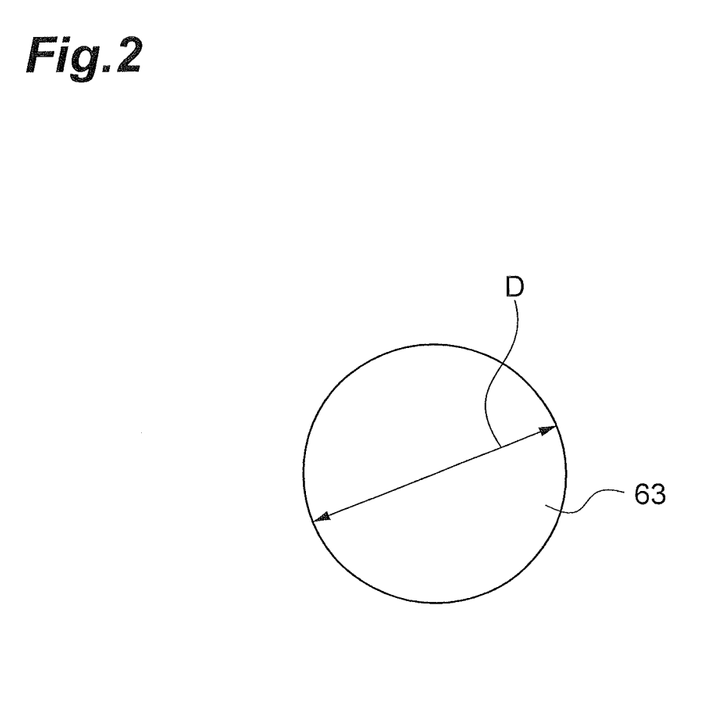
FIG. 2 is a diagram for explaining a fuel particle.

The fuel particle 63 will now be explained. The fuel particle 63 is a particle which generates a predetermined radiation when energized by irradiation with laser light, for example. FIG. 2 is a diagram for explaining the fuel particle 63. The fuel particle 63 is constituted by a deuterated plastic (hereinafter also referred to as "CD"). By the deuterated plastic is meant a plastic in which hydrogen atoms are replaced with deuterium atoms. When a hydrocarbon-based gas is used as the high-pressure gas, poorly-soluble cross-linked polymers are employable. The fuel particle 63 is a solid sphere. The fuel particle 63 has a diameter D which is controlled by a known method. It is controlled by a method described in Non Patent Literature 1, for example. The fuel particle 63 of this embodiment has the diameter D controlled so as to fall within the range of 100 to 500 nm (at least 100 nm but not greater than 500 nm).

The fuel particle 63, which is a sphere of a deuterated plastic, is produced by a known method. For example, it is made by a method described in Non Patent Literature 2. This method polymerizes commercially available deuterated monomers, so as to fabricate a sphere of a deuterated plastic.

The fuel particle 63 also contains tritium (T). That is, the fuel particle 63 is a sphere made of a deuterated-tritiated plastic (hereinafter also referred to as "CDT") in which a deuterated plastic is doped with tritium. The fuel particle 63, which is a sphere made of a deuterated-tritiated plastic, is produced by a known method. For example, it is made by a method described in Non Patent Literature 3. This method cuts a carbon-deuterium bond in a deuterated plastic with ultraviolet rays in a tritium gas atmosphere. At thus cut position, deuterium is replaced with tritium, so as to fabricate a sphere of a deuterated-tritiated plastic.

The stirrer 26 uniformly mixes the liquid, fuel particles 63, and liquefied gas contained in the mixed liquid 61. The stirrer 26 comprises a main unit 27, a joint 28, and a stirring part 29. The main unit 27 and the stirring part 29 are connected to each other through the joint 28. The main unit 27 has a motor or the like and imparts a rotational force to the joint 28. The rotational force is transmitted to the stirring part 29 through the joint 28. The stirring part 29 is sunk in the mixed liquid 61. As the stirring part 29 rotates in the mixed liquid 61, the liquid, fuel particles 63, and liquefied gas contained in the mixed liquid 61 are uniformly mixed.

The jet formation unit 30 comprises a valve chest 31, a needle 32, a nozzle 33, and a jet controller 34. The jet formation unit 30 forms the jet 61a of the mixed liquid 61. The jet formation unit 30 jets the mixed liquid 61 out of a small hole 33a, so as to convert the pressure applied to the mixed liquid 61 into a kinetic energy. Operations of the jet controller 34 are controlled by the main control unit 50.

The nozzle 33 is arranged at one end of the valve chest 31. The nozzle 33 is formed with the small hole 33a. The small hole 33a has a diameter smaller than the width of the valve chest 31. The needle 32 is placed at the other end opposite to the one end arranged with the nozzle 33. The needle 32 functions as a lid for the small hole 33a of the nozzle 33. The needle 32 extends from one end side of the valve chest 31 to the other end side thereof. The other end of the needle 32 extends to the outside of the valve chest 31, so as to be connected to the jet controller 34. The leading end of the needle 32 on the one end side of the valve chest 31 has a tapered form. The leading end is adapted to abut the small hole 33a of the nozzle 33.

The time when the leading end 32a abuts the small hole 33a is a state where the jet 61a is not formed, i.e., a closed state. When the leading end 32a is separated from the small hole 33a, on the other hand, a gap is formed between the small hole 33a and the needle 32. The mixed liquid 61 is jetted from this gap. This is an open state. The amount of jet of the mixed liquid 61 is controlled according to the amount of movement of the needle 32. A timing for jetting the mixed liquid 61 is controlled according to a timing at which the needle 32 is moved. The amount and timing for moving the needle 32 is controlled by the jet controller 34. According to control signals sent from the main control unit 50, the jet controller 34 controls the amount and timing for controlling the needle 32. The mixed liquid 61 is jetted from the small hole 33a of the nozzle 33 into the chamber 40.

The chamber 40 is constructed such that the pressure therewithin can be reduced. The inner region 40a of the chamber 40 is regulated to a predetermined pressure by the exhaust device 41. The pressure of the inner region 40a is adjusted so as to become lower than the valve chest pressure P1 in the valve chest 31 of the jet formation unit 30. The internal pressure P2 of the inner region 40a is set according to the intensity of laser light L1 emitted from the laser light source 45. That is, it is set to such a pressure that no breakdown is caused by the laser light L1. For example, the internal pressure P2 is 1 Pa or less when the intensity of the laser light L1 is $10^{18}$ W/cm². A turbomolecular pump which is a vacuum pump or the like is used for the exhaust device 41.

The reaction container 44, laser light source 45, and measurement unit 46 are arranged in the inner region 40a having the reduced pressure. The reaction container 44 is made of a deuterated plastic and has a reaction unit 44a set therein. The reaction unit 44a is a region where the jet 61a of the mixed liquid 61 is formed and also a region where neutrons are generated by irradiating a particle group 63a of fuel particles 63 with the laser light L1. The reaction container 44 is formed with a hole 44b for passing the jet 61a therethrough, a laser light entrance hole 44c for passing the laser light therethrough, and holes 44d, 44e for passing therethrough probe laser light L2 of the measurement unit 46. Since the reaction container 44 is provided with the holes 44b to 44e, the internal pressure of the reaction container 44 is the same as the internal pressure P2 of the chamber 40.

The laser light source 45 emits the laser light L1 for irradiating the particle group 63a. The laser light L1 is emitted in a direction intersecting a direction 61b of the jet 61a of the mixed liquid 61. The laser light L1 has such an intensity as to be able to generate a nuclear fusion reaction in the particle group 63a. The laser light L1 is very short pulsed laser light and has a pulse width on the order of femtoseconds or picoseconds. Operations of the laser light source 45 are controlled by the main control unit 50. The intensity and emission timing of the laser light L1 is controlled according to control signals outputted from the main control unit 50.

In this embodiment, which involves a nuclear fusion reaction between deuterium atoms (D-D reaction), the reaction cross section attains its peak value when the ion energy is 2 to 3 MeV (at least 2 MeV but not greater than 3 MeV) in the center-of-mass system. Therefore, an ion having this energy is generated. The energy of an ion produced by a Coulomb explosion is determined by the intensity of the laser light L1 and the diameter D of the fuel particle 63. For example, the intensity of the laser light L is about $10^{18}$ W/cm³ when the diameter D of the fuel particle 63 is 300 to 400 nm (at least 300 nm but not greater than 400 nm).

The measurement unit 46 acquires a measurement value corresponding to the number of fuel particles 63 per unit volume (hereinafter also referred to as "number density"). The timing for jetting the mixed liquid 61 in the jet controller 30 or timing for emitting the laser light L1 is controlled according to the measurement value. A Mie scattering measurement device is used for the measurement unit 46. The Mie scattering measurement device is a measurement device utilizing a light scattering phenomenon by the fuel particle 63, which is a sphere having a size on a par with the wavelength of the probe laser light. The measurement unit 46 comprises a measurement light source 46a and a light-receiving unit 46b. The measurement light source 46a and the light-receiving unit 46b are arranged such that the probe laser light L2 emitted from the measurement light source 46a reaches the light-receiving unit 46b through the region where the particle group 63a is formed. A laser light source is used for the measurement light source 46a. A photodiode which is an optical element is used for the light-receiving unit 46b. The measurement value corresponding to the number density of fuel particles 63 is obtained according to the intensity of the probe laser light L2 received by the light-receiving unit 46b. In this embodiment, a voltage value is obtained as the measurement value. Thus obtained voltage value is outputted to the main control unit 50 through the I/O terminal 43c.

When the laser light L1 irradiates the particle group 63a, the whole spot of the laser light L1 is covered with a plurality of fuel particles 63, while the fuel particles 63 do not cohere. Such a condition is satisfied by setting the number density of fuel particles 63 to a predetermined value. For example, when the diameter D of the fuel particle 63 is 400 nm while the Rayleigh length of the laser light L1 is 2 mm, the number density of fuel particles 63 falls within the range of $10^{10}$ to $10^{12}$ cm$^{-3}$ (at least $10^{10}$ cm$^{-3}$ but not greater than $10^{12}$ cm$^{-3}$). This number density of fuel particles 63 is achieved by optimizing the jetting of the mixed liquid 61 and the irradiation timing of the laser light L1.

The main control unit 50, which is a piece of hardware equipped with CPU, ROM, and the like, totally controls various devices constituting the radiation generating apparatus 1A. The main control unit 50 controls all the constituents for irradiating the particle group 63a with the laser light L1 at an optimal timing. For example, the opening and closing of the valve 13, control of irradiation with the laser light L1 from the laser light source 45, control of the measurement unit 46, analysis of measurement results of the measurement unit 46, and control of the pressure applied to the mixed liquid 61 are executed. Measurement values outputted from the measurement unit 46 and pressure gauge 42 are fed into the main control unit 50. The main control unit 50 outputs control signals for controlling the laser light source 45, measurement light source 46a, exhaust device 41, and jet controller 34.

Figure 3:
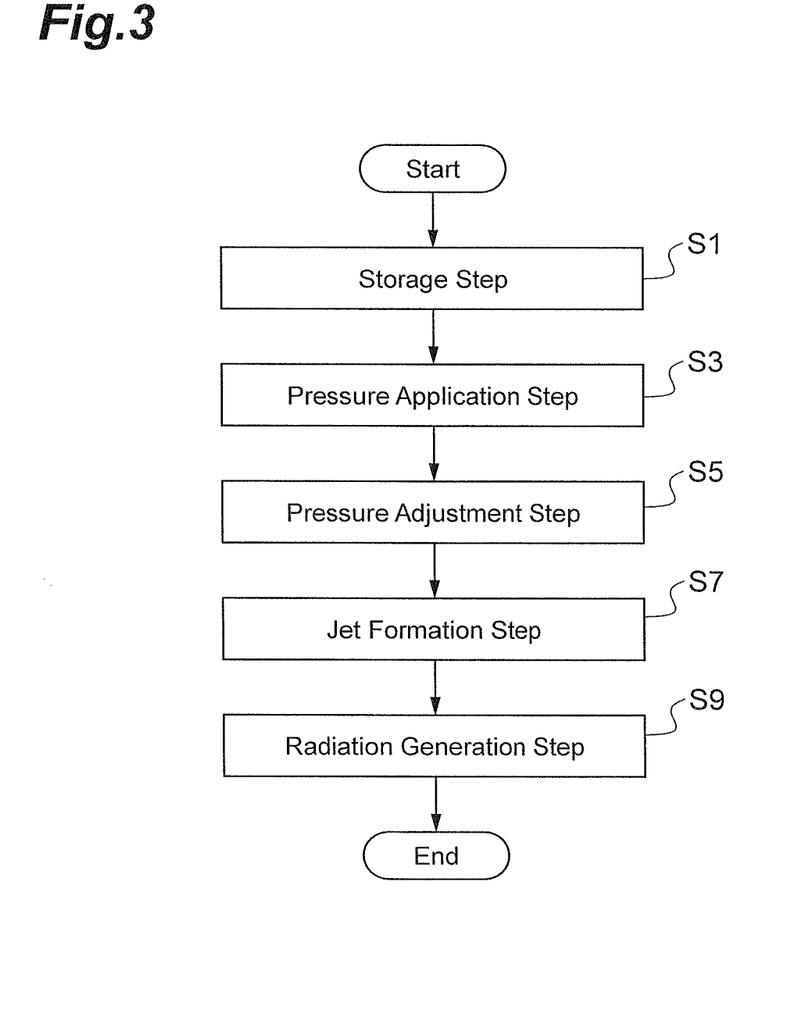
FIG. 3 is a flowchart illustrating main steps of the radiation generating method of the first embodiment.

Operations of the radiation generating apparatus 1A will now be explained. FIG. 3 is a flowchart illustrating main steps of the radiation generating method of the first embodiment. The radiation generating method of the first embodiment has a storage step S1, a pressure application step S3, a pressure adjustment step S5, a jet formation step S7, and a radiation generation step S9.

To begin with, the storage step S1 is performed. The storage step S1 is a step of preparing the suspension 62 and storing it into the storage container 21 of the fuel storage unit 20. First, the fuel particles 63 are prepared. The fuel particles 63, each of which is a sphere made of a deuterated plastic containing deuterium, are produced by a known method. Subsequently, the suspension 62 is prepared. The suspension 62 is obtained by suspending the fuel particles 63 in a liquid which is ethanol or methanol. In the suspension 62, 10 to 50% (at least 10% but not greater than 50%) by weight of the fuel particles 63 based on the weight of the liquid are suspended. Thus prepared suspension 62 is stored into the storage region 23 from the fuel supply unit 24 of the storage container 21. When storing the suspension 62 into the storage container 21, the valve 13 is in its closed state, so that no pressure is applied from the high-pressure gas tank 11.

The ratio of fuel particles 63 in the suspension 62 is in proportion to the number density of the particle group 63a. Therefore, as the ratio of fuel particles 63 is greater, the maximum value of number density of the particle group 63a increases. Increasing the ratio of fuel particles 63 contained in the suspension 62 may clog the nozzle 33. Therefore, the suspension 62 contains about 10 to 50% by weight of the fuel particles 63 based on the weight of the liquid.

Stable jetting of the mixed liquid 61 without clogging and a high number density of the fuel particles 63 are achieved at the same time. While the ratio of fuel particles 63 satisfying these two conditions seems to be defined by the diameter D of the fuel particles 63, the optimal ratio varies depending on specs of the nozzle 33 and the like and thus is determined by actual measurement for each time.

Next, the pressure application step S3 is performed. The pressure application step S3 is a step of applying a pressure to the suspension 62 stored in the storage container 21. The valve 13 of the gas pipe 12 connected to the storage container 21 is opened, so as to introduce the high-pressure gas from the high-pressure gas tank 11 to the storage region 23. The high-pressure gas is a fluorocarbon- or hydrocarbon-based gas liquefied by being pressurized to 5 to 10 atm (at least 5 atm but not greater than 10 atm). Opening the valve 13 introduces the liquefied gas into the storage region 23. The liquefied gas is in a liquid state and thus is mixed with the suspension 62, so as to form the mixed liquid 61.

Here, the pressure adjustment step S5 is performed. The pressure adjustment step S5 is a step of adjusting the internal pressure P2 of the inner region 40a of the chamber 40. The main control unit 50 sends a control signal to the exhaust device 41, and the exhaust device 41 having received the control signal reduces the pressure within the chamber 40. The internal pressure P2 of the chamber 40 is obtained by the pressure gauge 42. According to the internal pressure P2 outputted from the pressure gauge 42, the main control unit 50 controls the exhaust device 41.

Subsequently, the jet formation step S7 is performed. The jet formation step S7 is a step of jetting the pressurized mixed liquid 61 out of the small hole 33a of the nozzle 33 so as to form the jet 61a in the reaction unit 44a. The leading end 32a of the needle 32 abuts the small hole 33a. Upon receiving a control signal from the main control unit 50, the jet controller 34 regulates the position of the needle 32, so as to separate the leading end 32a of the needle 32 from the small hole 33a for a predetermined time. During the separation, the pressurized mixed liquid 61 is jetted from the gap between the small hole 33a and the leading end 32a of the needle 32. After a lapse of a predetermined time, the jet controller 34 regulates the position of the needle 32 so that the leading end 32a of the needle 32 abuts the small hole 33a again, thereby stopping jetting the mixed liquid 61.

Then, the radiation generation step S9 is performed. The radiation generation step S9 is a step of irradiating the particle group 63a constituted by the fuel particles 63 formed from the jet 61a of the mixed liquid 61 with the laser light L1. Jetting the mixed liquid 61 into the reaction unit 44a drastically vaporizes the liquefied gas in the mixed liquid 61. As a consequence, the liquefied gas and liquid move away from the fuel particles 63. That is, the vaporized liquefied gas dissipates the gas from the mixed liquid 61. The dissipated liquefied gas and liquid are let out of the chamber 40 by the exhaust device 41. On the other hand, the fuel particles 63 in the mixed liquid 61 move along the direction 61b of the jet 61a. That is, the fuel particles 63 in the mixed liquid 61 have a kinetic energy imparted when jetted out of the jet formation unit 30 and thus advance straightforward from the nozzle 33 to the reaction unit 44a, so as to form the particle group 63a. The laser light source 45 having received a control signal from the main control unit 50 irradiates the particle group 63a with the laser light L1. The laser light L1 causes a Coulomb explosion in the particle group 63a, thereby generating ions. These ions are atomic nuclei of deuterium released by the Coulomb explosion. These deuterium ions cause a deuterium nuclear fusion reaction (D-D reaction), thereby generating neutrons. When a sphere made of a deuterated-tritiated plastic is used as the fuel particle 63, a deuterium-tritium nuclear fusion reaction (D-T reaction) generates neutrons.

Here, the laser light L1 irradiates the particle group 63a when the fuel particles 63 have the highest number density in the particle group 63a. That is, the laser light L1 irradiates the particle group 63a when the light-receiving unit 46b incurs the largest attenuation by scattering. In the following, a process for emitting the laser light L1 at an optimal timing will be explained.

First, after a lapse of a preset delay time DT from the transmission of a jet signal to the jet controller 34, an irradiation signal is sent to the laser light source 45, so as to emit the laser light L1. In this period, the laser light L1 and probe laser light L2 are received by the light-receiving unit 46b. The light-receiving unit 46b outputs a time history of voltage corresponding to the intensity of light received. This voltage is fed into the main control unit 50 through the I/O terminal 43c. From the time history of voltage, a time T1 at which the particle group 63a attains the highest number density and a time T2 at which the laser light L1 is emitted are determined. Then, a time difference $\Delta T$ between the time T1 at which the particle group 63a attains the highest number density and the time T2 at which the laser light L1 is emitted is acquired as a feedback signal. It is determined whether or not the time difference $\Delta T$ falls within a preset threshold range of time difference ST.

When the time difference $\Delta T$ is outside of the preset range of time difference ST, the value of delay time DT is changed. In this embodiment, a timing for jetting the mixed liquid 61 is altered, so as to change the value of delay time DT. Next, the mixed liquid 61 is jetted, the laser light L1 is emitted, and a time history of voltage corresponding to the number density of fuel particles 63 is acquired. Subsequently, the time difference ΔT is computed from the change in voltage with time obtained by the measurement. Then, the time difference ΔT and the threshold ST are compared with each other. The above-mentioned process is repeated until the time difference ΔT satisfies the threshold ST. Performing the above-mentioned process can yield a favorable timing for emitting the laser light L1.

The acquisition of the values of time T1 at which the particle group 63a attains the highest number density and time T2 at which the laser light L1 is emitted, computation of the time difference ΔT, and comparison of the time difference ΔT with the threshold ST are executed by the main control unit 50.

Figure 4:
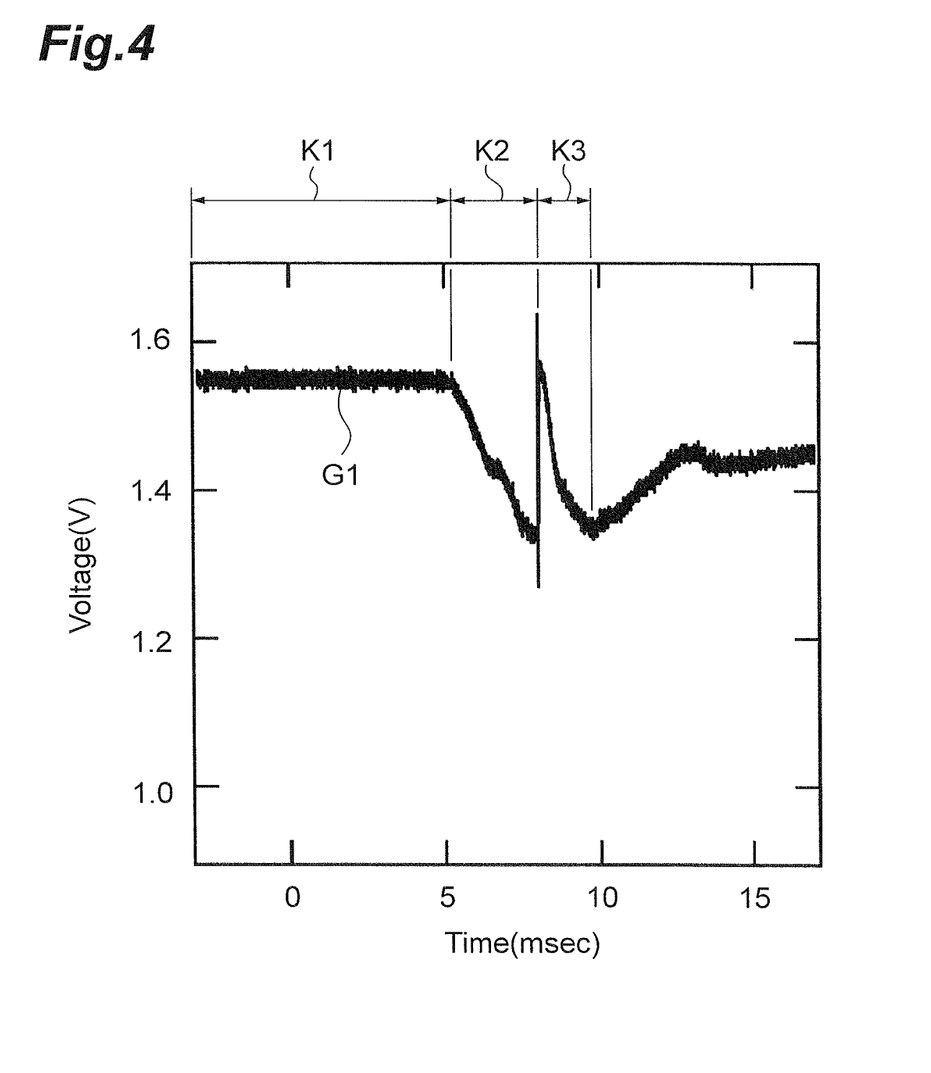
FIG. 4 is a chart for explaining operations of the radiation generating apparatus in accordance with the first embodiment.

FIG. 4 is a chart illustrating an example of time history of voltage acquired by the light-receiving unit 46b. Graph G1 of FIG. 4 represents a time history of voltage outputted from the light-receiving unit 46b. In section K1, the particle group 63a is not formed in the reaction unit 44a, whereby the probe laser light L2 emitted from the measurement light source 46a does not scatter. When the mixed liquid 61 is jetted, so as to form the particle group 63a, the intensity of the probe laser light L2 received by the light-receiving unit 46b gradually attenuates (section K2). At the timing exhibiting the largest attenuation, the laser light source 45 emits the laser light L1, whereby the intensity of light received by the light-receiving unit 46b increases instantaneously (section K3). It is seen from the graph G1 that the laser light L1 is emitted when the intensity of the probe laser light L2 received by the light-receiving unit 46b is the lowest.

A radiation generating apparatus which generates a desirable radiation by irradiating a fuel particle with laser light having a high intensity has been under study. In this scheme, laser light rips an electron off the fuel particle, so as to generate an ion. This ion can cause a Coulomb explosion, thereby yielding a high-energy ion. The kind of radiation to be generated is determined by the kind of reaction caused by the high-energy ion. For example, when generating a neutron beam, the neutron beam generation efficiency regulates the intensity of laser light and the diameter of the fuel particle to optimal values. For enhancing the radiation generation efficiency, it is necessary for the fuel particles to exist independently without cohesion. Also needed about the fuel particles is an environment free of gases and dusts which inhibit laser light from being absorbed. In addition, a particle group having a sufficient number density is irradiated with laser light at an optimal timing.

In the radiation generating apparatus 1A and radiation generating method of this embodiment, the mixed liquid 61 having a liquefied gas mixed in the suspension 62 is jetted from the jet formation unit 30 to the reaction unit 44a. The internal pressure P2 of the reaction unit 44a is set lower than the valve chest pressure P1 of the jet formation unit 30. The liquefied gas in the jet 61a of the mixed liquid 61 vaporizes drastically, so as to expand, thereby dissipating liquid components from the suspension 62. This eliminates the liquefied gas and liquid from the jet 61a of the mixed liquid 61. The fuel particles 63 have a kinetic energy imparted when jetted out of the jet formation unit 30 and thus advance straightforward in the predetermined direction 61b, so as to form the particle group 63a. The particle group 63a is irradiated with the laser light L1, so as to generate a desirable radiation. Thus, a structure for jetting the mixed liquid 61 containing the fuel particles 63 forms the particle group 63a, whereby the apparatus can be constructed simple. Since the particle group 63a to be irradiated with the laser light L is mixed with a reduced amount of the liquid, gas, and the like, the laser light L1 is restrained from scattering. Hence, the particle group 63a is favorably irradiated with the laser light L1, so that the neutron beam generation efficiency can be improved.

The radiation generating apparatus 1A of this embodiment is equipped with the measurement unit 46 and thus can obtain the number density of fuel particles 63 in the particle group 63a. A favorable timing for emitting the laser light L1 is determined from the number density of fuel particles 63. This makes it possible to control the energy of deuterium ions produced by the Coulomb explosion upon the laser irradiation such that the neutron generation efficiency is the highest. Hence, the efficiency in energy conversion from the laser light L1 to deuterium improves, whereby the neutron beam generation efficiency can further be raised.

In the radiation generating apparatus 1A of this embodiment, the fuel particles 63 contain deuterium. Deuterium ions occur when the fuel particles 63 are irradiated with the laser light L1. These deuterium ions cause a deuterium nuclear fusion reaction, thereby generating neutrons. Hence, the neutron beam generation efficiency can be improved.

In the radiation generating apparatus 1A of this embodiment, the reaction unit 44a is covered with the reaction container 44. The reaction container 44 is made of a deuterated plastic. In such a structure, the reaction unit 44 is bombarded with deuterium ions generated by irradiation with the laser light L1, whereby neutrons are produced. Hence, a neutron beam which is a radiation can be generated efficiently.

In the radiation generating apparatus 1A of this embodiment, the diameter D of the fuel particle 63 is controlled so as to fall within the range of 100 to 500 nm (at least 100 nm but not greater than 500 nm). Such a structure favorably controls the energy of ions generated by the Coulomb explosion. Hence, a neutron beam which is a radiation can be generated efficiently.

Figure 5:
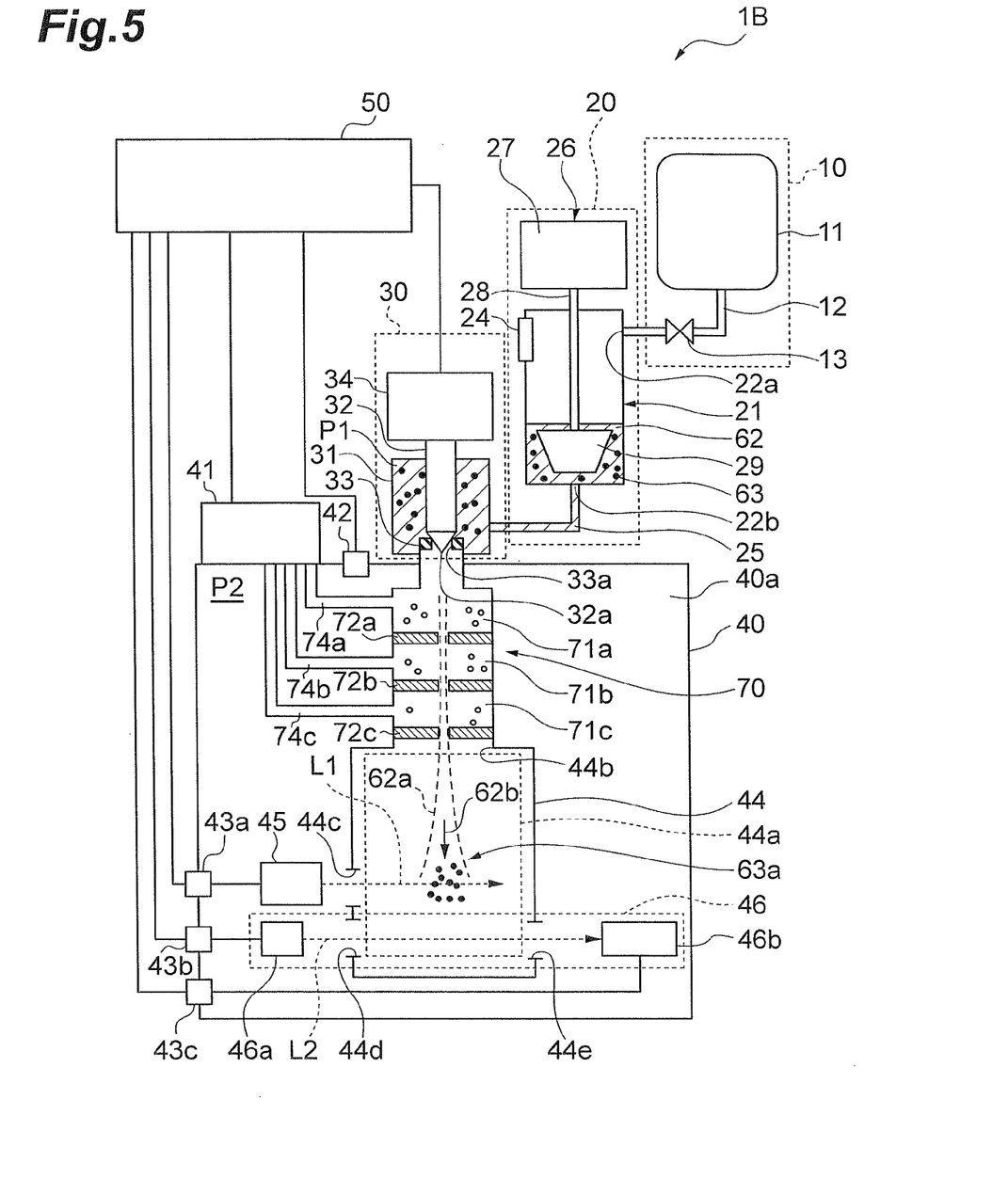
FIG. 5 is a diagram for explaining the structure of the radiation generating apparatus in accordance with a second embodiment.

A radiation generating apparatus 1B of the second embodiment will now be explained. FIG. 5 is a diagram for explaining the structure of the radiation generating apparatus 1B. The radiation generating apparatus 1B differs from the radiation generating apparatus 1A in that it comprises an exhaust unit 70. It also differs from the radiation generating apparatus 1A in that a nitrogen gas is used as a high-pressure gas for applying a pressure to the suspension 62. Except for these points, it is constructed as with the radiation generating apparatus 1A. The exhaust unit 70 will be explained in detail here.

The exhaust unit 70 is an exhaust device based on a so-called differential pumping system. The exhaust unit 70 has a plurality of small chambers 71a to 71c. The small chambers 71a to 71c are arranged along a direction 62b in which the particle group 63a advances. The small chamber 71a is arranged on the most upstream side. One end of the small chamber 71a is connected to the nozzle 33 of the jet formation unit 30. The small chamber 71c is arranged on the most downstream side. One end of the small chamber 71c is connected to the reaction container 44. The small chamber 71b is arranged between the small chambers 71a, 71c. The small chambers 71a to 71c are separated from each other by orifices 72a to 72c. That is, the orifice 72a is arranged between the small chambers 71a, 71b. The orifice 72b is arranged between the small chambers 71b, 71c. The orifice 72c is arranged between the small chamber 71c and the reaction container 44.

Exhaust pipes 74a to 74c are connected to the small chambers 71a to 71c, respectively. That is, the exhaust pipe 74a is connected to the small chamber 71a, the exhaust pipe 74b to the small chamber 71b, and the exhaust pipe 74c to the small chamber 71c. The other ends of the exhaust pipes 74a to 74c are connected to the exhaust device 41. The internal pressure of the small chamber 71b is set lower than that of the small chamber 71a. The internal pressure of the small chamber 71c is set lower than that of the small chamber 71b. Thus, the exhaust unit 70 comprises a plurality of small chambers stepwise enhancing the degree of vacuum that is defined by the internal pressure.

Figure 6:
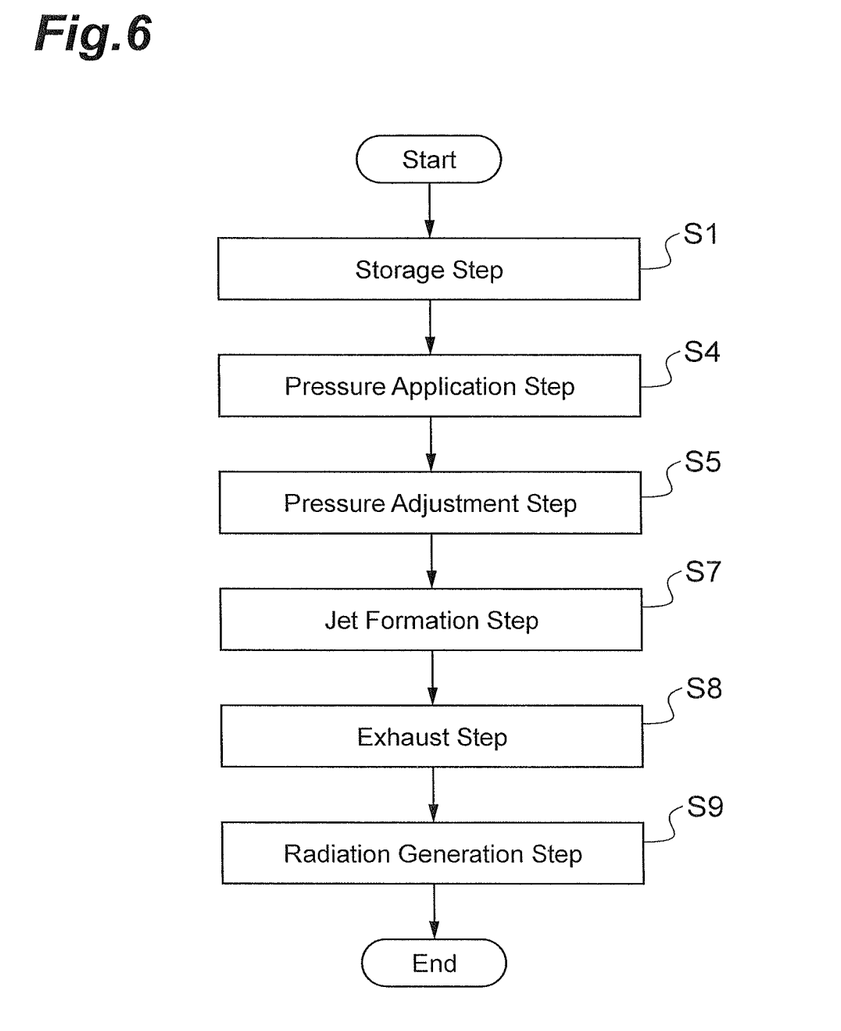
FIG. 6 is a flowchart illustrating main steps of the radiation generating method of the second embodiment.

A radiation generating method using the radiation generating apparatus 1B in accordance with this embodiment will now be explained. FIG. 6 is a flowchart illustrating main steps of the radiation generating method of this embodiment. The radiation generating method of this embodiment has a storage step S1, a pressure application step S4, a pressure adjustment step S5, a jet formation step S7, an exhaust step S8, and a radiation generation step S9. The radiation generating method of this embodiment differs from the radiation generating method of the first embodiment in the pressure application step S4 and exhaust step S8. The remaining storage step S1, pressure adjustment step S5, jet formation step S7, and radiation generation step S9 are the same as those in the radiation generating method of the first embodiment. The pressure application step S4 and exhaust step S8 will be explained in detail here.

The pressure application step S4 is a step of applying a pressure to the suspension 62 stored in the storage container 21. The pressure application step S4 of this embodiment differs from the pressure application step S3 of the first embodiment in that it applies the pressure to the suspension 62 by using a nitrogen gas.

The valve 13 of the gas pipe 12 connected to the storage container 21 is opened, so as to introduce the high-pressure gas from the high-pressure gas tank 11 to the storage region 23. The high-pressure gas is a nitrogen gas pressurized to 5 to 10 atm (at least 5 atm but not greater than 10 atm). When the valve 13 is opened, the nitrogen gas is introduced to the storage region 23.

The exhaust step S8 will now be explained. The suspension 62 is jetted from the jet formation unit 30 to the small chamber 71a. The internal pressure of the small chamber 71a is set lower than the valve chest pressure P1 of the valve chest 31 in the jet formation unit 30. Therefore, a part of the liquid contained in the suspension 62 jetted to the small chamber 71a vaporizes. The vaporized liquid is let out through the exhaust pipe 74a. Subsequently, the jet 62a devoid of a part of the liquid moves to the small chamber 71b. The internal pressure of the small chamber 71b is set lower than that of the small chamber 71a. Therefore, a part of the liquid contained in the suspension 62 further vaporizes. The vaporized liquid is let out through the exhaust pipe 74b. Then, the jet 62a devoid of a part of the liquid moves to the small chamber 71c. The internal pressure of the small chamber 71c is set lower than that of the small chamber 71b. Therefore, a part of the liquid contained in the suspension 62 further vaporizes. The vaporized liquid is let out through the exhaust pipe 74c. Through these processes, the liquid is eliminated from the jet 62a of the suspension 62, whereby the particle group 63a of fuel particles 63 is formed. The particle group 63a passes through the small hole of the orifice 72c, so as to move into the reaction container 44.

A part of the fuel particles 63 are let out of the small chambers 71a to 71c together with the vaporized liquid. The amount of fuel particles 63 let out is reduced by optimizing the form of the nozzle 33.

In the radiation generating apparatus 1B of this embodiment, the suspension 62 is jetted from the jet formation unit 30 to the exhaust unit 70. The exhaust unit 70 eliminates liquid components from the jet 62a of the suspension 62. The fuel particles 63 have a kinetic energy imparted when jetted out of the jet formation unit 30 and thus advance straightforward from the exhaust unit 70 to the reaction container 44, so as to form the particle group 63a. The particle group 63a is irradiated with the laser light L1, so as to generate a desirable radiation. Thus, a structure for jetting the suspension 62 containing the fuel particles 63 forms the particle group 63a of fuel particles 63, whereby the apparatus can be constructed simple. The particle group 63a of fuel particles 63 to be irradiated with the laser light L1 is mixed with a reduced amount of the liquid. Therefore, the laser light L1 is restrained from scattering. Hence, the particle group 63a is favorably irradiated with the laser light L1, so that the neutron beam generation efficiency can be improved.

Figure 7:
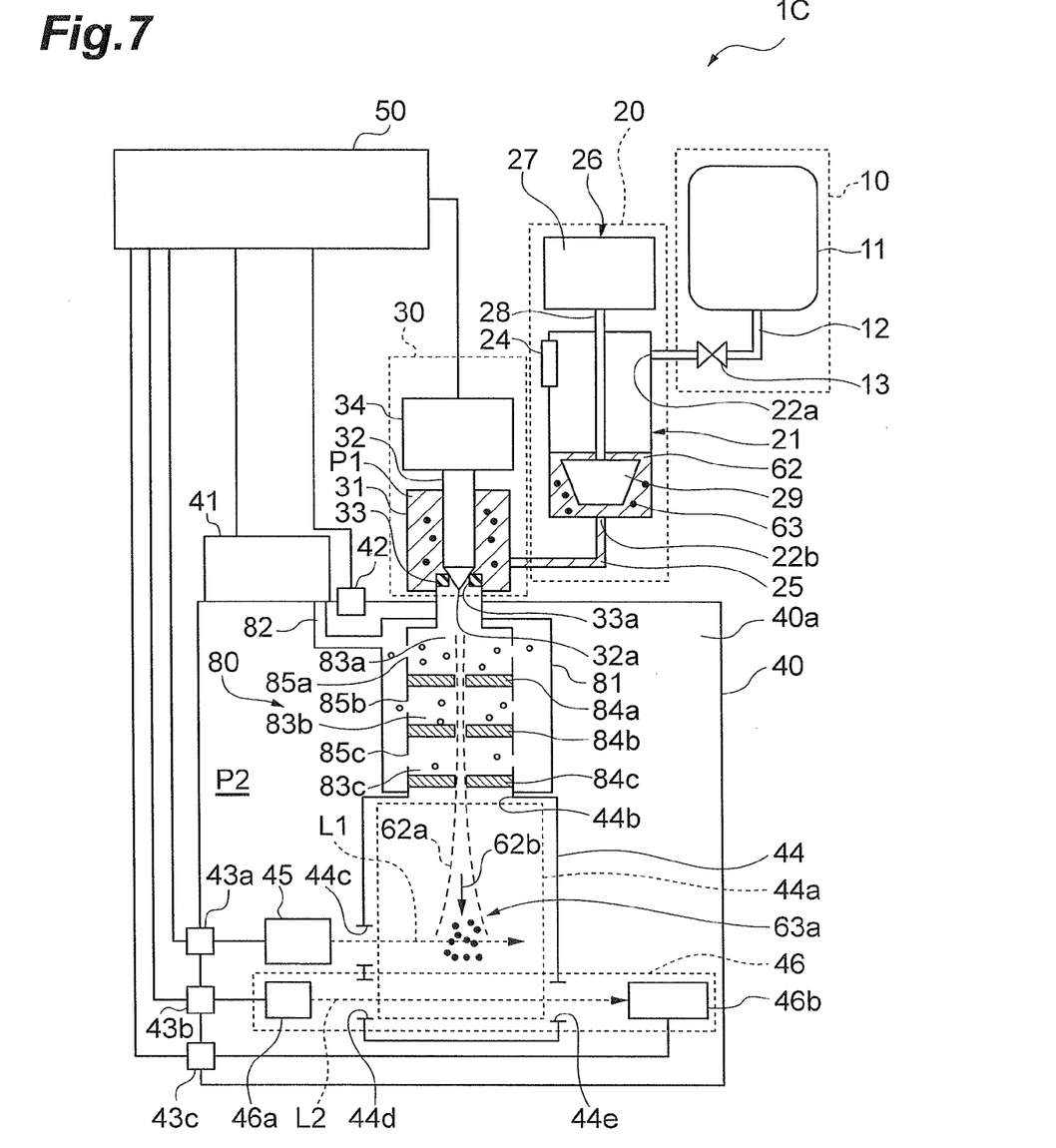
FIG. 7 is a diagram for explaining a modified example of the radiation generating apparatus in accordance with the second embodiment.

A modified example of the radiation generating apparatus 1B will now be explained. FIG. 7 is a diagram for explaining the structure of a radiation generating apparatus 1C which is a modified example of the radiation generating apparatus 1B. The radiation generating apparatus 1C differs from the radiation generating apparatus 1B in that it comprises an exhaust unit 80 having a structure different from that of the exhaust unit 70. Except for this point, it is constructed as with the radiation generating apparatus 1B. The exhaust unit 80 will be explained in detail here.

The exhaust unit 80 is an exhaust device based on the so-called differential pumping system. The exhaust unit 80 has a shroud 81. The shroud 81 is connected to the exhaust device 41 through an exhaust pipe 82. Small chambers 83a to 83c are arranged within the shroud 81. The small chambers 83a to 83c are arranged along a direction in which the particle group 63a advances. The small chamber 83a is arranged on the most upstream side. One end of the small chamber 83a is connected to the nozzle 33 of the jet formation unit 30. The small chamber 83c is arranged on the most downstream side. One end of the small chamber 83c is connected to the reaction container 44. The small chamber 83b is arranged between the small chambers 83a, 83c. The small chambers 83a to 83c are separated from each other by orifices 84a to 84c. That is, the orifice 84a is arranged between the small chambers 83a, 83b. The orifice 84b is arranged between the small chambers 83b, 83c. The orifice 84c is arranged between the small chamber 83c and the reaction container 44. The small chambers 83a to 83c are provided with exhaust windows 85a to 85c, respectively. Thus, the exhaust unit 80 eliminates the liquid from the suspension 62 by differential pumping with a plurality of orifices 84a to 84c.

The radiation generating method of the third embodiment will now be explained. This radiation generating method differs from that of the first embodiment in that it generates various radiations which are different from neutron beams in type. Atoms contained in fuel particles for generating radiations in the radiation generating method of the third embodiment differ from those in the fuel particles 63 of the first embodiment. As a radiation generating apparatus, any of the above-mentioned radiation generating apparatus 1A to 1C may be used.

A mode for generating a proton beam will now be explained. For generating the proton beam, a fuel particle made of a compound containing hydrogen is used. That is, a sphere of a hydrogenated plastic (CH sphere) is used in place of a sphere of a deuterated plastic (CD sphere). A fuel particle which is a sphere of a hydrogenated plastic is produced by a known method. For example, it is made by a method described in Non Patent Literature 2. This method polymerizes commercially available deuterated monomers, so as to fabricate a sphere of a hydrogenated plastic. This fuel particle has a diameter of 100 nm or greater. A suspension suspending such fuel particles is jetted into the reaction unit 44a, so as to form a particle group. This particle group is irradiated with laser light having an intensity of $10^{18}$ W/cm$^2$ or higher. A Coulomb explosion occurs in the particle group irradiated with the laser light. This phenomenon generates protons accelerated to an energy of several tens of MeV. As in the case of generating neutrons by using the fuel particles 63 of the first embodiment, the energy of the proton beam is controlled according to the diameter of the fuel particle and the intensity of laser light irradiating the particle group. By using fuel particles in which the mixing ratio between hydrogen and other atoms is regulated, such a mode can control the energy of the proton beam to be generated and efficiently produce the proton beam.

A mode for generating an electromagnetic radiation will now be explained. For generating the electromagnetic radiation, a fuel particle having an energy resonance line corresponding to the energy of a desirable electromagnetic radiation is used. For example, tin (Sn) is used when the desirable electromagnetic radiation is a very short ultraviolet ray. Zinc (Zn) or copper (Cu) is used when the desirable electromagnetic radiation is a soft X-ray having an energy of 0.1 to 2 keV (at least 0.1 keV but not greater than 2 keV). Titanium (Ti) is used when the desirable electromagnetic radiation is an X-ray having an energy of 2 to 20 keV (at least 2 keV but not greater than 20 keV). In such a structure, an electromagnetic radiation corresponding to an energy resonance line in a predetermined atom occurs when the fuel particles are heated by irradiation with laser light. Therefore, an electromagnetic radiation having a high luminance can be generated efficiently.

A mode for generating an electron beam will now be explained. For generating the electron beam, a fuel particle made of gold, which is a substance containing a large amount of electrons, is used, for example. Such a structure can generate a large amount of electron beams efficiently.

The above-mentioned embodiments illustrate an example of the radiation generating apparatus and radiation generating method in accordance with one aspect of the present invention. The radiation generating apparatus and radiation generating method in accordance with one aspect of the present invention are not limited to the above-mentioned embodiments, but may be those in which the radiation generating apparatus and radiation generating method of the above-mentioned embodiments are modified or applied to others within a scope not departing from the gist set forth in the claims.

While the radiation generating apparatus 1A to 1C are equipped with the reaction container 44 in the above-mentioned embodiments, this is not restrictive. The radiation generating apparatus 1A to 1C may be free of the reaction container 44.

INDUSTRIAL APPLICABILITY

The radiation generating apparatus 1A to 1C and radiation generating methods can simplify the structure of the apparatus and improve the radiation generation efficiency.

REFERENCE SIGNS LIST 1A, 1B, 1C . . . radiation generating apparatus; 10 . . . pressure application unit; 11 . . . high-pressure gas tank; 12 . . . gas pipe; 13 . . . valve; 20 . . . fuel storage unit; 21 . . . storage container; 22a . . . input part; 22b . . . exit part; 23 . . . storage region; 24 . . . fuel supply unit; 25 . . . outlet pipe; 26 . . . stirrer; 27 . . . main unit; 28 . . . joint; 29 . . . stirring part; 30 . . . jet formation unit; 31 . . . valve chest; 32 . . . needle; 32a . . . leading end; 33 . . . nozzle; 33a . . . small hole; 34 . . . jet controller; 40 . . . chamber; 41 . . . exhaust device (pressure adjustment unit); 42 . . . pressure gauge; 43c . . . I/O terminal; 44 . . . reaction container; 44a . . . reaction unit; 44b to 44e . . . hole; 45 . . . laser light source (light source unit); 46 . . . measurement unit; 46a . . . measurement light source; 46b . . . light-receiving unit; 50 . . . main control unit; 61 . . . mixed liquid; 61a, 61b . . . jet; 62 . . . suspension; 63 . . . fuel particle; 63a . . . particle group; 70, 80 . . . exhaust unit; 71a to 71c, 83a to 83c . . . small chamber; 72a to 72c, 84a to 84c . . . orifice; 74a to 74c . . . exhaust pipe; 81 . . . shroud; 82 . . . exhaust pipe; D . . . diameter; DT . . . delay time; G1 . . . graph; K1 to K3 . . . section; L1 . . . laser light; L2 . . . probe laser light; P1 . . . valve chest pressure; P2 . . . internal pressure; S1 . . . storage step; S3, S4 . . . pressure application step; S5 . . . pressure adjustment step; S7 . . . jet formation step; S8 . . . exhaust step; S9 . . . radiation generation step; ST . . . time difference (threshold); ΔT . . . time difference

The invention claimed is:

1. A radiation generating apparatus comprising:
a fuel storage unit for storing a mixed liquid having a liquefied gas mixed in a suspension containing a liquid and a plurality of fuel particles dispersed in the liquid, the liquefied gas comprising a fluorocarbon- or hydrocarbon-based gas;
a pressure application unit for applying a pressure to the mixed liquid stored in the fuel storage unit;
a jet formation unit for jetting the pressurized mixed liquid out of a small hole so as to form a jet of the mixed liquid;
a reaction unit for forming the jet therein from which the mixed liquid is jetted from the jet formation unit, which causes the plurality of fuel particles in the mixed liquid to move along a direction of the jet and the liquefied gas in the jet vaporizes in a reduced-pressure atmosphere to expand, thereby dissipating the liquid from the suspension, while the liquefied gas and the liquid move away from the plurality of fuel particles and are eliminated from the jet of the suspension, to form a particle group;
a pressure adjustment unit for setting a pressure in the reaction unit lower than an internal pressure of the jet formation unit; and
a light source unit for irradiating the particle group constituted by the plurality of fuel particles with laser light.

2. The radiation generating apparatus according to claim 1, further comprising a measurement unit for obtaining a measurement value corresponding to the number of fuel particles per unit volume of the particle group.

3. The radiation generating apparatus according to claim 1, wherein the fuel particle contains deuterium and generates a neutron when irradiated with the laser light.

4. The radiation generating apparatus according to claim 1, wherein the fuel particle contains hydrogen and generates a proton when irradiated with the laser light.

5. The radiation generating apparatus according to claim 1, wherein the fuel particle contains an atom having a predetermined energy resonance line and generates an electromagnetic radiation corresponding to the energy resonance line.

6. A radiation generating method comprising:
storing in a fuel storage unit a mixed liquid having a liquefied gas mixed in a suspension containing a liquid and a plurality of fuel particles dispersed in the liquid, the liquefied gas comprising a fluorocarbon- or hydrocarbon-based gas;
applying a pressure to the mixed liquid stored in the fuel storage unit;
prior to jetting, pressure in a reaction unit forming a jet of the mixed liquid lower than an internal pressure of a jet formation unit
jetting the pressurized mixed liquid out of a small hole to form the jet of the mixed liquid in the reaction unit; and
irradiating a particle group constituted by the plurality of fuel particles with laser light to generate a radiation;
wherein, in the reaction unit, the mixed liquid is jetted from the jet formation unit to the reaction unit, which causes the plurality of fuel particles in the mixed liquid to move along a direction of the jet and the liquefied gas in the jet vaporized in a reduced-pressure atmosphere to expand, thereby dissipating liquid components from the suspension, while the liquefied gas and the liquid move away from the plurality of fuel particles and are eliminated from the jet of the suspension, to form the particle group.

7. The radiation generating apparatus according to claim 1, further comprising a high pressure gas tank that stores the liquefied gas comprising a fluorocarbon- or hydrocarbon-based gas.

8. The radiation generating apparatus according to claim 7, wherein the gas tank is connected to the fuel storage unit by a gas pipe.

9. The radiation generating apparatus according to claim 1, wherein the fuel storage unit comprises a stirrer.

10. The radiation generating apparatus according to claim 1, wherein the jet formation unit comprises a valve chest that contains the mixed liquid.

11. The radiation generating apparatus according to claim 1, wherein the small hole of the jet formation unit is disposed at one end of the valve chest.

12. The radiation generating apparatus according to claim 1, wherein the jet formation unit is connected to the fuel storage unit by an outlet pipe.

* * * * *